US012574726B2

(12) United States Patent
Reeves et al.

(10) Patent No.: US 12,574,726 B2
(45) Date of Patent: Mar. 10, 2026

(54) METHOD OF OPERATING A NETWORK INCLUDING HIDDEN AND TARGET WLANS

(71) Applicant: BRITISH TELECOMMUNICATIONS PUBLIC LIMITED COMPANY, London (GB)

(72) Inventors: Andrew Reeves, London (GB); MohammadHossein Zoualfaghari, London (GB); Ian Neild, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 241 days.

(21) Appl. No.: 18/551,327

(22) PCT Filed: Feb. 21, 2022

(86) PCT No.: PCT/EP2022/054265
§ 371 (c)(1),
(2) Date: Sep. 19, 2023

(87) PCT Pub. No.: WO2022/199963
PCT Pub. Date: Sep. 29, 2022

(65) Prior Publication Data
US 2024/0171973 A1 May 23, 2024

(30) Foreign Application Priority Data
Mar. 23, 2021 (GB) ...................................... 2104045

(51) Int. Cl.
*H04W 12/06* (2021.01)
*H04W 12/03* (2021.01)
(Continued)

(52) U.S. Cl.
CPC ........... *H04W 12/06* (2013.01); *H04W 12/03* (2021.01); *H04W 12/08* (2013.01); *H04W 48/16* (2013.01); *H04W 84/12* (2013.01)

(58) Field of Classification Search
CPC ..... H04W 12/06; H04W 12/03; H04W 12/08; H04W 48/16; H04W 48/12
See application file for complete search history.

(56) References Cited

U.S. PATENT DOCUMENTS 9,949,120 B2    4/2018    Liu et al.
10,292,027 B2    5/2019    Goluboff
(Continued)

FOREIGN PATENT DOCUMENTS

CN    104093164    10/2014
CN    204168311    2/2015
(Continued)

OTHER PUBLICATIONS

Combined Search and Examination Report for GB2207757.2 dated Oct. 31, 2022 (5 pages).
(Continued)

*Primary Examiner* — Viet D Vu
(74) *Attorney, Agent, or Firm* — Nixon & Vanderhye P.C.

(57) ABSTRACT

A method 200 of operating a telecommunications network (100), the telecommunications network comprising: User Equipment (UE) (110); a first Wireless Local Area Network (WLAN) (130), identifiable by means of a first network identifier: a hidden WLAN (130); and a target WLAN (130); and the method comprising the steps of: configuring the hidden WLAN so as to have a hidden network identifier that is cryptographically derived from the first network identifier (240)); by means of the UE: retrieving, from the first WLAN, the first network identifier (230); cryptographically processing the retrieved first network identifier thereby to
(Continued)

derive the hidden network identifier (240); searching for a WLAN using the derived hidden network identifier (250): and requesting a connection to, or via, the target WLAN only after discovering the hidden WLAN (270). There is also provided a method of operating the User Equipment (UE), a method of operating set of Wireless Access Points (120), as well as User Equipment, a set of Wireless Access Points. and a telecommunications system therefor.

16 Claims, 2 Drawing Sheets

(51) Int. Cl.

| | | |
|---|---|---|
| *H04W 12/08* | (2021.01) | |
| *H04W 48/16* | (2009.01) | |
| *H04W 84/12* | (2009.01) | |

(56) References Cited

U.S. PATENT DOCUMENTS

| | | | | |
|---|---|---|---|---|
| 10,298,581 | B2 | 5/2019 | Shah et al. | |
| 10,334,438 | B2 | 6/2019 | Iyer et al. | |
| 2004/0253969 | A1 | 12/2004 | Nguyen et al. | |
| 2005/0286456 | A1 | 12/2005 | McNew et al. | |
| 2006/0135068 | A1* | 6/2006 | Jaakkola | H04W 48/16 |
| | | | | 455/516 |
| 2008/0198823 | A1 | 8/2008 | Shiu et al. | |
| 2008/0220741 | A1 | 9/2008 | Hung | |
| 2010/0309815 | A1 | 12/2010 | Yepez et al. | |
| 2013/0103807 | A1 | 4/2013 | Couto et al. | |
| 2014/0128102 | A1* | 5/2014 | Finlow-Bates | H04W 48/08 |
| | | | | 455/456.3 |
| 2015/0050906 | A1 | 2/2015 | Yuasa | |
| 2016/0087811 | A1 | 3/2016 | Yin et al. | |
| 2016/0249287 | A1 | 8/2016 | Xie et al. | |
| 2017/0034215 | A1* | 2/2017 | Sigel | H04W 12/08 |
| 2017/0055315 | A1 | 2/2017 | Lin | |
| 2017/0245234 | A1 | 8/2017 | Bradish | |
| 2017/0347359 | A1 | 11/2017 | Yang et al. | |
| 2018/0176771 | A1 | 6/2018 | Yang et al. | |
| 2018/0241724 | A1* | 8/2018 | Yu | H04W 76/10 |
| 2018/0376448 | A1 | 12/2018 | Wild et al. | |
| 2020/0037134 | A1 | 1/2020 | Wheeler | |
| 2020/0275466 | A1 | 8/2020 | Hodroj | |
| 2021/0152421 | A1* | 5/2021 | Wang | H04L 63/083 |
| 2021/0315010 | A1 | 10/2021 | Hsu et al. | |
| 2021/0400443 | A1 | 12/2021 | Wheeler | |

FOREIGN PATENT DOCUMENTS

| | | |
|---|---|---|
| CN | 104796888 | 7/2015 |
| CN | 104869612 | 8/2015 |
| CN | 104981000 | 10/2015 |
| CN | 105764050 | 7/2016 |
| CN | 105792315 | 7/2016 |
| CN | 106304409 | 1/2017 |
| CN | 106572465 | 4/2017 |
| CN | 106847264 | 6/2017 |
| CN | 107529205 | 12/2017 |
| CN | 108391238 | 8/2018 |
| CN | 108834137 | 11/2018 |
| CN | 109547266 | 3/2019 |
| CN | 110366229 | 10/2019 |
| CN | 110460995 | 11/2019 |
| CN | 110557305 | 12/2019 |
| CN | 110730043 | 1/2020 |
| CN | 112738867 | 4/2021 |
| DE | 10 2021 134 386 | 9/2022 |
| EP | 1 576 444 | 9/2005 |
| EP | 1871072 | 12/2007 |
| EP | 3122144 | 1/2017 |
| EP | 3576444 | 12/2019 |
| EP | 3664491 | 6/2020 |
| GB | 2552016 | 1/2018 |
| GB | 2607948 | 12/2022 |
| JP | 2013222993 | 10/2013 |
| JP | 2015-104017 | 6/2015 |
| JP | 2017-194891 | 10/2017 |
| KR | 10-2010-0048986 | 5/2010 |
| KR | 101964983 | 4/2019 |
| KR | 101980039 | 5/2019 |
| WO | 2004/059450 | 7/2004 |
| WO | 2009/016368 | 2/2009 |
| WO | 2015063146 | 5/2015 |
| WO | 2016/180062 | 11/2016 |
| WO | 2018/227715 | 12/2018 |
| WO | 2019/048857 | 3/2019 |
| WO | 2019/233311 | 12/2019 |
| WO | 2020/066627 | 4/2020 |
| WO | 2022/067274 | 3/2022 |

OTHER PUBLICATIONS

Combined Search and Examination Report for GB2108742.4 dated Dec. 3, 2021 (7 pages).
GB Combined Search and Examination Report for GB2104045.6 dated Jul. 6, 2021 (5 pages).
International Search Report and Written Opinion for PCT/EP2023/059799, dated Jul. 7, 2023 (13 pages).
International Search Report and Written Opinion for PCT/EP2022/062584, dated Sep. 8, 2022 (10 pages).
Extended European Search Report for EP22175623.2 dated Nov. 21, 2022 (8 pages).
International Search Report and Written Opinion for PCT/EP2022/054265 dated Jul. 11, 2022 (16 pages).
Texas Instruments, WiLink™ 8 WLAN Features User's Guide, Literature No. SWRU423A, Jul. 2015—Revised May 2016 (44 pages).
Communication pursuant to Article 94(3) EPC, issued in EP Application No. 22711898.1, dated Feb. 4, 2025, 8 pages.
Intention to Grant issued in GB Application No. 2207757.2, dated Apr. 17, 2025, 2 pages.
Service set (802.11 network)—Wikipediahttps://en.wikipedia.org/wiki/Service_set_(802.11_network), 5 pages.
International Preliminary Report on Patentability dated Dec. 5, 2024, issued for International Application No. PCT/EP2023/059799 (8 pages).
Combined Search and Examination Report dated Feb. 20, 2023, issued for GB Application No. GB2301541.5 (4 pages).
Combined Search and Examination Report dated Apr. 19, 2022, issued for GB Application No. GB2116053.6 (7 pages).
Combined Search and Examination Report dated Jul. 20, 2022, issued for GB Application No. GB2201522.6 (5 pages).
International Search Report and Written Opinion dated Feb. 7, 2023, issued for International Application No. PCT/EP2022/078200 (17 pages).
Further Exam Report dated Sep. 30, 2022, issued for GB Application No. GB2201522.6 (2 pages).
International Search Report and Written Opinion dated Apr. 11, 2023, issued for International Application No. PCT/EP2023/050572 (17 pages).
Patents Act 1977: Examination Report under Section 18(3) dated Sep. 17, 2025 (4 pages).
Communication pursuant to Article 94(3) EPC dated Oct. 31, 2025 issued for European Patent Application No. 22 711 898.1 (7 pages).
Patents Act 1977: Examination Report under Section 18(3) dated Nov. 24, 2025, issued for GB2108742.4 (3 pages).

\* cited by examiner

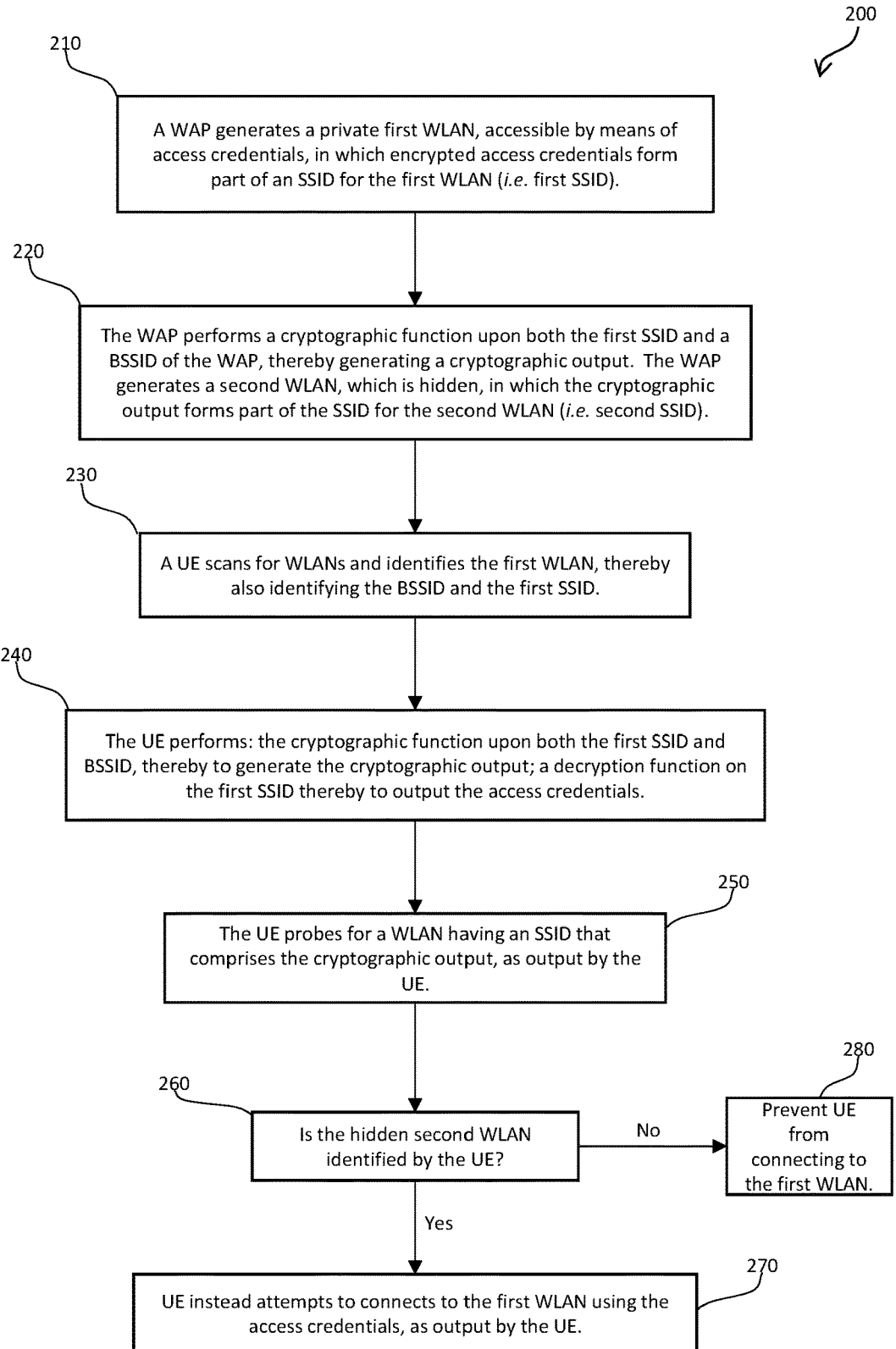

200

210

A WAP generates a private first WLAN, accessible by means of access credentials, in which encrypted access credentials form part of an SSID for the first WLAN (*i.e.* first SSID).

220

The WAP performs a cryptographic function upon both the first SSID and a BSSID of the WAP, thereby generating a cryptographic output. The WAP generates a second WLAN, which is hidden, in which the cryptographic output forms part of the SSID for the second WLAN (*i.e.* second SSID).

230

A UE scans for WLANs and identifies the first WLAN, thereby also identifying the BSSID and the first SSID.

240

The UE performs: the cryptographic function upon both the first SSID and BSSID, thereby to generate the cryptographic output; a decryption function on the first SSID thereby to output the access credentials.

250

The UE probes for a WLAN having an SSID that comprises the cryptographic output, as output by the UE.

260

Is the hidden second WLAN identified by the UE?

No →

280

Prevent UE from connecting to the first WLAN.

Yes

270

UE instead attempts to connects to the first WLAN using the access credentials, as output by the UE.

Figure 2

METHOD OF OPERATING A NETWORK INCLUDING HIDDEN AND TARGET WLANS

CROSS-REFERENCE TO RELATED APPLICATIONS

This application is the U.S. national phase of International Application No. PCT/EP2022/054265 filed Feb. 21, 2022, which designated the U.S. and claims priority to GB 2104045.6 filed Mar. 23, 2021, the entire contents of each of which are hereby incorporated by reference.

FIELD OF INVENTION

The present invention relates to method of operating a telecommunications network, and in particular a Wireless Local Area Network (WLAN), as well as to a system and components therefor.

BACKGROUND

Wireless Access Points (WAPs) may facilitate data connectivity between a wide area network (e.g. a fixed-access broadband network) and wireless communication devices (herein also referred to as "User Equipment", UE).

WAPs provide Wireless Local Area Networks (WLANs) that work over a radio frequency spectrum with low transmit power, typically providing a range of several meters. For example, the WLAN is available to use any one of the IEEE™ 802.11 family of standards (commonly known as Wi-Fi™). A UE is available to connect to the WLANs provided by the WAP.

In order for a UE to connect to a WLAN, the UE must first identify the WAP providing the WLAN, as well as identify the WLAN itself. Having identified the WLAN and the WAP, a UE may, typically (and as generally recommended), first need to be authenticated so as to connect to the WLAN; this is typically performed by a user providing to the WAP access credentials (e.g. a password) associated with the WLAN.

With ever-increasing numbers of WAPs, WLANs and UEs, managing secure access to WLANs may be a burdensome task for users of UEs, requiring manual identification of WLANs and input of access credentials.

To help reduce this burden, there have been proposed methods for automatically deriving access credentials for a WLAN and then connecting to that WLAN using such derived access credentials; these such methods may be referred to as a "zero touch connection" process, since user input is not required each time a UE is to be connected to a new WLAN.

In order to facilitate "zero touch connection", access credentials may be encoded within a broadcast network identifier for a WLAN, such as a Service Set IDentifier (SSID), and a UE may decode the network identifier so as to derive the access credentials. The UE then attempts to connect to a WLAN with which the access credentials are associated.

However, ever-more sophisticated methods are being developed to compromise secure operation of WLANs. Since a UE may not be able to verify the authenticity of a "zero touch connection" system, by spoofing network identifiers that are configured for "zero touch connection", the UE may be caused to attempt (and re-attempt) connection to a malicious WLAN or to a legitimate WLAN, but using incorrect access credentials; in both cases the UE may be prevented from establishing a connection to a legitimate WLAN (e.g. as a result of being misdirected to a malicious WLAN or being blacklisted by a legitimate WLAN). Furthermore, this form of attack may cause a legitimate WLAN to be overloaded with access requests so as to detrimentally affect the operation of the WLAN. The effects may be analogous to a denial of service attack (upon a UE and/or a WLAN).

It is an aim of the present invention to at least alleviate some of the aforementioned problems.

Statements of Invention

According to a first aspect of the present invention, there is provided: a method of operating a telecommunications network, the telecommunications network comprising: User Equipment (UE); a first Wireless Local Area Network (WLAN), identifiable by means of a first network identifier; a hidden WLAN; and a target WLAN; and the method comprising the steps of: configuring the hidden WLAN so as to have a hidden network identifier that is cryptographically derived from the first network identifier; by means of the UE: retrieving, from the first WLAN, the first network identifier; cryptographically processing the retrieved first network identifier thereby to derive the hidden network identifier; searching for a WLAN using the derived hidden network identifier; and requesting a connection to, or via, the target WLAN only after discovering the hidden WLAN.

As used herein, the term "hidden", with reference to a "WLAN" and/or a "network identifier", preferably connotes being undiscoverable to the UE, and preferably not being publicly broadcast. Preferably, retrieving the first network identifier is performed by the UE searching (or probing) for a WLAN, and subsequently detecting the first WLAN. Optionally, the UE is configured so as to be biased towards, compelled to, prioritise, and more preferably to most prioritise, attempt/attempting to connect to the target WLAN. Optionally, the first WLAN, hidden WLAN and/or target WLAN is/are unsecured (public or unencrypted), and therefore may not require access credentials for the UE to connect to the WLAN/s. Optionally, the first WLAN, hidden WLAN and/or target WLAN is/are secured (private or encrypted), and therefore require access credentials for the UE to connect to the WLAN/s. Preferably, cryptographically processing the first network identifier is performed in response to the UE identifying a pre-defined string in the first network identifier.

Preferably, cryptographically processing the first network identifier is performed upon only a portion of the first network identifier, said portion being identifiable to UE by means of a/the pre-defined string in the first network identifier. Optionally, the target WLAN is also hidden (where the target WLAN and first WLAN are distinct). Preferably, the UE is simultaneously within range of the first, hidden and/or target WLAN/s. As used herein, "cryptographically derived" and/or "cryptographically processing" preferably connotes generated as a result of performing a cryptographic function, which may in turn include encrypting, decrypting, encoding, decoding, hashing and/or salting.

Preferably, the method further comprises the step of preventing the UE from requesting a connection with the target WLAN in response to the hidden WLAN remaining hidden to the UE. Preferably, said preventing is performed on an ongoing basis, such that the target WLAN may be blocked or blacklisted. Preferably, the hidden WLAN is determined to remain hidden to the UE after the UE performs the searching for a predetermined period of time and fails to identify a WLAN using the derived hidden network identifier within this period of time.

Preferably, the method further comprises the steps of: configuring the target WLAN to be accessible to the UE only using access credentials; providing the first network identifier so as to comprise an output of an encryption function performed on the access credentials; by means of the UE, in response to retrieving the first network identifier, decoding the first network identifier, thereby to output the access credentials; and wherein requesting the connection to the target WLAN is performed using the output access credentials. Preferably, the UE is provided with a decryption function corresponding to the encryption function, thereby to allow the UE to output the access credentials. Optionally, the first network identifier is generated based on the access credentials. Optionally, the access credentials are generated based on the first network identifier. Preferably, the access credentials comprise a: username; password; and/or token. Preferably, the encryption function is performed by: a Wireless Access Point (WAP) generating the first WLAN; or a server that is remote, and accessible, to the WAP. Optionally, decoding the first network identifier is performed upon only a portion of the first network identifier, said portion being identifiable to UE by means of a/the pre-defined string in the first network identifier.

Preferably, the target WLAN is connected to a wide area network, and wherein requesting the connection via the target WLAN is performed so as to connect the UE to the wide area network. Preferably, the method further comprises the steps of: configuring the wide area network so as to be accessible to the UE via the target WLAN only using access credentials; providing the first network identifier so as to comprise an output of an encryption function performed on the access credentials; by means of the UE, in response to retrieving the first network identifier, decoding the first network identifier, thereby to output the access credentials; and wherein requesting the connection to the wide area network via the target WLAN is performed using the access credentials. Preferably, the wide area network is only accessible to the UE by means of a captive portal.

Preferably, the target WLAN is identifiable by means of a target network identifier, and wherein the first network identifier is provided so as to comprise the target network identifier; and wherein the target network identifier is derived by the UE from the retrieved first network identifier and used by the UE to request the connection to the target WLAN. Alternatively, the UE may be preloaded with the target network identifier, and the UE may also be configured to attempt to connect to the target WLAN by default. Preferably, a "network identifier" (e.g. the "first", "hidden" and/or "target") is a Service Set Identifier (SSID).

Preferably, the first network identifier is provided so as to further comprise an output of a cryptographic function performed on the target network identifier; and wherein the target network identifier is derived by the UE performing the cryptographic function upon the first network identifier. Preferably, so as to generate the first network identifier, the cryptographic function is performed by the WAP, or a server that is remote, and accessible, to the WAP. Optionally, the first network identifier consists (only) of the output of the cryptographic function and/or the encryption function. Optionally, the target WLAN and the first WLAN are the same. Optionally, the target WLAN and the hidden WLAN are the same.

Preferably, the method further comprises the steps of: retrieving a network device identifier associated with a Wireless Access Point (WAP), wherein said WAP provides the first WLAN; further providing the first network identifier so as to comprise the output of the, or a (further), encryption function performed on the network device identifier. Preferably, the network device identifier is a Basic Service Set Identifier (BSSID) for the WAP. Optionally, the first WLAN is provided by a first Wireless Access Point (WAP), the hidden WLAN is provided by a second WAP, and the target WLAN is provided by a third WAP. Optionally, the first WAP is the same as the second WAP and/or the third WAP. Alternatively, the second WAP may be the same as the third WAP.

Preferably, the method further comprises the step of changing the network device identifier after establishing a connection between the UE and the target WLAN. Preferably, the network device identifier is changed upon termination of the connection. Alternatively, the network device identifier may be changed after each communication between the UE and the target WLAN.

According to another aspect of the invention, there is provided a method of operating User Equipment (UE), the UE forming part of a telecommunications network comprising: a first Wireless Local Area Network (WLAN), identifiable by means of a first network identifier; a hidden WLAN having a hidden network identifier that is cryptographically derived from the first network identifier; and a target WLAN; and the method comprising the steps of: retrieving, from the first WLAN, the first network identifier; cryptographically processing the retrieved first network identifier thereby to derive the hidden network identifier; searching for a WLAN using the derived hidden network identifier; and requesting a connection to, or via, the target WLAN only after discovering the hidden WLAN.

According to yet another aspect of the invention, there is provided a method of operating a set of Wireless Access Points (WAPs), the set of WAPs forming part of a telecommunications network comprising User Equipment (UE) available to connect to a WAP in the set of WAPs, and the method comprising the steps of: providing a first WLAN, identifiable by means of a first network identifier; and providing a hidden WLAN having a hidden network identifier that is cryptographically derived from the first network identifier; and providing a target WLAN, to, or via, which the UE is available to connect in response to the UE identifying the hidden WLAN. Optionally, the set comprises a single WAP. Optionally, the UE is available to connect to the target WLAN only after confirming that the UE has identified the hidden WLAN to the set of WAPs, and in particular to the WAP that is providing the target WLAN.

According to still another aspect of the invention, there is provided a computer-readable carrier medium comprising a computer program, which, when the computer program is executed by a computer, causes the computer to carry out the steps of any of methods described above.

According to a further aspect of the invention, there is provided User Equipment (UE) configured to access a telecommunications network, the telecommunications network comprising: a first Wireless Local Area Network (WLAN), identifiable by means of a first network identifier; a hidden WLAN having a hidden network identifier that is cryptographically derived from the first network identifier; and a target WLAN; and the UE comprising: a processor configured to cause the UE to: retrieve, from the first WLAN, the first network identifier; cryptographically process the retrieved first network identifier thereby to derive the hidden network identifier; search for a WLAN using the derived hidden network identifier; and a controller configured to cause the UE to request a connection to, or via, the target WLAN only after discovering the hidden WLAN.

According to another aspect of the invention, there is provided a set of Wireless Access Points (WAPs) forming part of a telecommunications network comprising User Equipment (UE) available to connect to a WAP in the set of WAPs, the set of WAPs comprising: a first controller configured to provide a first WLAN, identifiable by means of a first network identifier; a second controller configured to provide a hidden WLAN having a hidden network identifier that is cryptographically derived from the first network identifier; and a third controller configured to provide a target WLAN, to, or via, which the UE is available to connect in response to the UE identifying the hidden WLAN.

According to a still further another aspect of the invention, there is provided a telecommunications system comprising: User Equipment (UE) as described above; and a set of Wireless Access Points (WAPs) as described above.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method of operating a telecommunications network, a method of operating User Equipment, a method of operating a set of Wireless Access Points, User Equipment, a set of Wireless Access Points and to a telecommunications system as described herein and/or substantially as illustrated with reference to the accompanying drawings. The present invention is now described, purely by way of example, with reference to the accompanying diagrammatic drawings, in which:

FIG. 2 shows a process for operating the telecommunications network.

SPECIFIC DESCRIPTION

Figure 1:
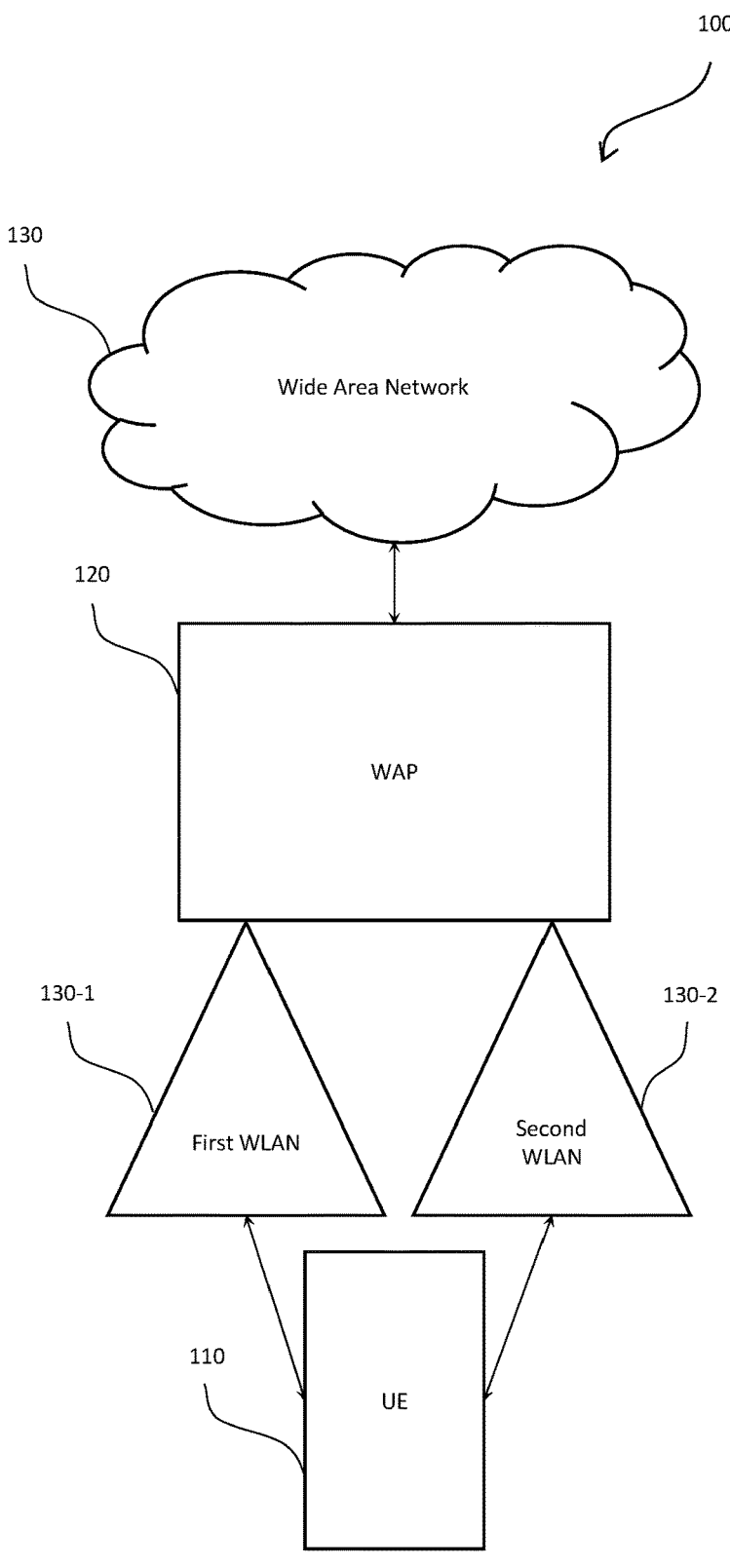
FIG. 1 is a schematic diagram of an exemplary telecommunications network.

FIG. 1 shows an exemplary telecommunications network 100, which comprises: a wireless communications device or User Equipment (UE) 110; a Wireless Access Point (WAP) 120; and a wide area network 130.

In one example, the WAP is wireless router, extender and/or repeater. The UE is available to be in the form of any device incorporating a WLAN interface, and in particular a/an: personal computer (laptop or desktop); mobile telecommunications device; Internet of Things (IOT) device; wireless repeater; and/or wireless extender.

The WAP 120 is configured to generate Wireless Local Area Networks (WLANs) 130, to which the UE 110 is available to connect. In this example, the WLANs are available to use any one of the IEEE™ 802.11 family of standards.

The WAP 120 is available to provide a plurality of WLANs, and in the example of FIG. 2, the WAP provides two separate WLANs—a first WLAN 130-1, and second WLAN 130-2.

The WAP 120 is connected (e.g. via an Ethernet connection) to the wide area network 130, for example in the form of a fixed-access broadband network. As a result, the UE 110 is available to connect, via a WLAN 130 provided by the WAP 120, to the wide area network 130, and in turn to, for example, the Internet.

The WAP 120 is configured to broadcast a network device identifier that identifies the WAP to the UE 110; this network device identifier is in the form of a Basic Service Set Identifier (BSSID). By convention, the BSSID is, or is derived from, a data link layer network address of the WAP (and specifically of a Network Interface Controller (NIC) of the WAP), such as a Media Access Control (MAC) address. The WAP is therefore identifiable to the UE using a BSSID.

The WAP 120 is also configured to broadcast a network identifier that identifies a specific WLAN to the UE 110; this network identifier is in the form of a Service Set IDentifier (SSID). By using different SSIDs (which are typically readily configurable) for the first 130-1 and the second 130-2 WLANs, each WLAN is separately identifiable by the UE.

The UE 110 is located sufficiently proximate to the WAP 120 so as to be within wireless range of the WAP, and therefore capable of communicating with the WAP 120.

The WAP 120 and the UE 110 are configured for "zero touch connection", in which the processes of a UE identifying a WLAN, retrieving new access credentials for the WLAN, authenticating the UE onto the WLAN using the new access credentials, and then connecting to the WLAN may be performed without user intervention.

In order to facilitate such "zero touch connection" securely, the WAP 120 is provided with a cryptographic routine, comprising an encryption function and a cryptographic function. Correspondingly, the UE 110 is provided with a counterpart cryptographic routine, comprising a decryption function, which is configured to decrypt cipertext generated according to encryption function, and the cryptographic function. The cryptographic routines also comprise instructions for directing when, how and upon what data to perform the encryption, decryption and cryptographic functions. For example, the encryption function comprises a symmetric or asymmetric algorithm, and in particular according to the Advanced Encryption Standard (AES).

As described in more detail below, the telecommunications network 100 is configured so that the UE 110 requests a new WLAN connection, having been secretly communicated access credentials for that WLAN, only after having authenticated the access credentials.

FIG. 2 shows an exemplary process 200 for authenticating a "zero touch connection" process for automatically establishing a WLAN connection with the UE 110.

At a first step 210, the WAP generates the first WLAN 130-1, which is identifiable by means of a first SSID, which is created as described below.

The first WLAN 130-1 is a secure WLAN; as a result, the WAP requires access credentials (comprising, at least, a password) from the UE 110 in order for the UE to connect to the first WLAN.

According to the cryptographic routine, the encryption function is performed (in this example, by the WAP) upon the access credentials associated with the first WLAN 130-1, thereby to generate ciphertext, and said ciphertext is used to form part of the first SSID. As a result, the access credentials for the first WLAN are encoded in the first SSID.

For example, the access credentials for the first WLAN consists of a password in the form of the text string "ZTCSSIDONE" (i.e. the plaintext password) and the encryption function comprises a shift (or "Caesar") cipher configured to apply a single forward shift through the English alphabet. In this example, the ciphertext is therefore "AUDTTJEPOF"; this ciphertext is used as the first SSID.

The first WLAN is made publicly visible, as such the WAP broadcasts the first SSID (e.g. "AUDTTJEPOF"), as well as the BSSID of the WAP 120 (e.g. "1111111111111111111111111111111").

At a next step 220, the WAP 120 generates the second WLAN 130-2.

According to the cryptographic routine, the cryptographic function is performed (in this example, by the WAP) upon both the first SSID and the BSSID of the WAP 120, thereby to generate a cryptographic output. The cryptographic output is then assigned to form part of the SSID for the second WLAN (i.e. the second SSID), and the second WLAN is generated on this basis.

For example, the cryptographic function is a hash function applied to a concatenation of the first SSID and then the BSSID, persisting with the specific examples provided above, the is cryptographic function an MD2 hash that is applied to "AUDTTJEPOF1111111111111111111111111111111"; the cryptographic output, and therefore the second SSID, is therefore "3dd7240572c594ae2e510259c872557d ".

The second WLAN 130-2 is configured as a hidden WLAN (as such, the second WLAN may also be referred to as the "hidden WLAN"). As a consequence, the second SSID is not publicly broadcast by the WAP, and is therefore unidentifiable to UEs that do not have prior knowledge of the second WLAN, including the UE 110 (at least, by step 220).

At a next step 230, the UE 110 initiates a search for available WLANs. Accordingly, the UE detects the first WLAN 130-1, as part of which the UE retrieves the first SSID and the BSSID of the WAP 120. Since the second WLAN 130-2 is hidden, and since the UE has no prior knowledge of the second WLAN, the UE cannot identify the second WLAN (despite being within range).

The UE is instructed to connect to the first WLAN 130-1 (as such, the first WLAN may also be referred to as the "target WLAN"); however, before attempting such a connection, at a next step 240, in response to retrieving the first SSID and the BSSID, the UE 110 performs the cryptographic routine, such that the UE performs the:

1. decryption function upon the first SSID (or only upon a portion in which the encrypted access credentials are encoded), thereby to derive the access credentials for the first WLAN 130-1; and 2. cryptographic function upon the first SSID and BSSID, thereby to output the cryptographic output, and therefore the second SSID.

Next 250, the UE searches for a WLAN based on the outputs from the UE 110 generated at preceding step 240.

To do so, the UE 110 transmits a probe request for a WLAN having an SSID matching the output by the UE of the cryptographic function upon the first SSID and BSSID, i.e. the second SSID.

The UE then monitors 260 whether there is a response from a WLAN having such a matching SSID, and therefore whether the second WLAN is present.

If there is such a WLAN, in response to the probe request from the UE, the second WLAN 130-2 identifies itself to the UE, and the UE discovers the presence of the second WLAN. In this way, the UE is able to verify that the entity (i.e. the first WLAN) from which the UE is deriving secret information (i.e. access credentials) that will be used to affect the operation of the UE (i.e. to attempt to connect to the first WLAN) is authentic (or the same party, in a cryptographic sense) due to the existence of expected hidden information (i.e. the second WLAN having the cryptographically-derived second SSID), and that the first WLAN is therefore unlikely to be an adversary to the UE.

At a next step 270, having confirmed the presence of the second WLAN 130-2 based on cryptographically-derived information, the UE 110 attempts to connect to the first WLAN 130-1. Since the first WLAN is a private WLAN, the WAP requests access credentials from the UE, and the UE accordingly submits the access credentials, as derived by the UE at step 240. Accordingly, the UE is available to connect to the first WLAN 130-1.

The UE 110 is therefore prevented from being compelled to attempt connection to the first WLAN 130-1 until the authenticity of the first WLAN is verified.

It will be appreciated that the UE is only effectively able to derive the access credentials for the first WLAN and the cryptographic output that forms part of the second SSID, because the UE and the WAP are applying corresponding cryptographic routines.

Accordingly, if at step 260 the UE does not detect the existence of a WLAN having an SSID matching the output by the UE of the cryptographic function upon the first SSID and BSSID, the UE prevents itself 280 from requesting a connection with the first WLAN 130-1, or to the WAP 120 more generally. This may arise if the UE 110 detects, instead of the WAP 120, a malicious WAP that is spoofing (replicating) the first WLAN. Since the malicious WAP is an adversary, it is not configured to generate a hidden (or the) second WLAN, the UE cannot therefore verify the malicious WAP, and the UE is therefore prevented from attempting to connect to the spoofed WLAN, or to the malicious WAP more generally.

In one example, for improved security, after step 270 (and in particular after termination of a connection between the UE 110, or all UEs, and the first WLAN 130-1) the WAP is configured to generate a new first SSID and/or BSSID that is/are different to that used by the WAP in a (or any) preceding steps, including any previous iterations, of process 200. In particular, the BSSID is available to be changed as frequently as with every message between the UE and the WAP. The UE is configured to block any attempts to connect to previously-used first SSIDs and/or BSSIDs (thereby also to arrive at step 280).

Alternatives and Modifications

In the aforementioned, the second SSID comprises the cryptographic output, as generated based on performing the cryptographic function upon both the first SSID and the BSSID; using both identifiers helps improve the security of the system. However, in one example, for greater simplicity, the cryptographic function is performed upon the first SSID or the BSSID so as to generate the second SSID by the UE 110 and WAP 120. Alternatively, the cryptographic function is available to be performed on other identifiers in addition to the first SSID and the BSSID.

In an alternative example, to improve security, the second WLAN is also a private WLAN that requires access credentials from the UE so as to connect to the second WLAN, and the UE only proceeds to step 270 after the UE has connected to (and then disconnected from) the second WLAN. In one example, the access credentials for the second WLAN is: a static password pre-known to the WAP and UE; or a password that is derived by the UE from the first SSID and/or BSSID using the, or another, encryption function.

In one example, the access credentials for the first WLAN 130-1 (and/or the second WLAN 130-2) are generated by a server, comprising the cryptographic routine, accessible via the wide area network 130, instead of at the WAP 120. Accordingly, the WAP is in communication with the server so as to receive the access credentials. In one example, the server is in the form of a cloud-based management system for the WAP 120.

In another alternative, the access credentials instead allow access to a third WLAN (and not to the first WLAN 130-1), and the UE is configured to connect to the third WLAN using access credentials derived according to a corresponding process to that described above. The third WLAN is available to be provided by the WAP or by another WAP (and in the latter case, both WAPs are in communication so as to share the access credentials for the third WLAN).

In yet another example, the first, second and/or third WLANs are public, as such no access credentials are required in order for the UE to establish a connection therewith. However, an onward connection from the UE to the wide area network requires authentication of the UE, as such the access credentials are instead used to access the wide area network, for example via a captive portal. In this example, the UE is configured only to request a connection to the wide area network upon identifying the presence of the second WLAN.

In yet another alternative, the first WLAN 130-1 and the second WLAN 130-2 are separately provided by two WAPs, in which each WAP is accessible to the UE, connected to the wide area network 130, and in communication with the other. Correspondingly, where there is a third WLAN, the third WLAN is available to be provided by either WAP, or by yet another similarly-configured WAP.

In one example, the UE is instructed to connect to the first WLAN based on pre-configured instructions provided to the UE, for example to attempt connection to the first WLAN by default or to attempt connection to any WLAN from which the UE retrieves an SSID and BSSID.

Alternatively, the identity (i.e. an SSID) of a target WLAN to which the UE is instructed to connect is communicated to the UE by means of an SSID; this target WLAN may be the first, second or third WLAN. As such, the access credentials encoded in the first SSID are associated with the target WLAN. For example, the SSID of the target WLAN is also provided as part of the first SSID, and in one example as plaintext and in another example as ciphertext (having also been encoded using the or another encryption function).

The UE is then configured to decode the first WLAN to derive both (and distinguish between) the target WLAN and the access credentials.

It will be appreciated that the method described above may be applied to other forms of WLAN and/or Wireless Personal Area Networks, for example based on Bluetooth™, Zigbee™, and WiMAX™.

In an alternative example, the UE only performs the cryptographic function (i.e. step 240) in response to identifying that the first SSID and/or BSSID is in a pre-defined format. For example, where the pre-defined format means that the SSID and/or BSSID start and/or end/s with a pre-defined set of characters.

In an alternative example, the UE only performs the encryption and/or cryptographic function upon a portion of the first SSID and/or BSSID, in which said portion is identifiable to the UE by means of a pre-defined prefix and/or suffix.

It will be appreciated that, the second WLAN need not carry user traffic, nor does the first WLAN where there is instead provided a third WLAN to which the UE ultimately connects.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of operating a telecommunications network, the telecommunications network comprising: User Equipment (UE); a first Wireless Local Area Network (WLAN), identifiable by means of a first network identifier; a hidden WLAN; and a target WLAN; and the method comprising the steps of:

configuring the hidden WLAN so as to have a hidden network identifier that is cryptographically derived from the first network identifier;

by means of the UE:

retrieving, from the first WLAN, the first network identifier;

cryptographically processing the retrieved first network identifier thereby to derive the hidden network identifier;

searching for a WLAN using the derived hidden network identifier; and requesting a connection to, or via, the target WLAN only after discovering the hidden WLAN; and the method further comprises the steps of:

retrieving a network device identifier associated with a Wireless Access Point (WAP), wherein said WAP provides the first WLAN; and further providing the first network identifier so as to comprise an output of an encryption function performed on the network device identifier.

2. A method according to claim 1, further comprising the step of preventing the UE from requesting a connection with the target WLAN in response to the hidden WLAN remaining hidden to the UE.

3. A method according to claim 1, further comprising the steps of:

configuring the target WLAN to be accessible to the UE only using access credentials;

providing the first network identifier so as to comprise the output of the encryption function performed on the access credentials;

by means of the UE, in response to retrieving the first network identifier, decoding the first network identifier, thereby to output the access credentials; and wherein requesting the connection to the target WLAN is performed using the output access credentials.

4. A method according to claim 1, wherein the target WLAN is connected to a wide area network, and wherein requesting the connection via the target WLAN is performed so as to connect the UE to the wide area network.

5. A method according to claim 4, further comprising the steps of:

configuring the wide area network so as to be accessible to the UE via the target WLAN only using access credentials;

providing the first network identifier so as to comprise the output of the encryption function performed on the access credentials;

by means of the UE, in response to retrieving the first network identifier, decoding the first network identifier, thereby to output the access credentials; and wherein requesting the connection to the wide area network via the target WLAN is performed using the access credentials.

6. A method according to claim 1, wherein the target WLAN is identifiable by means of a target network identifier, and wherein the first network identifier is provided so as to comprise the target network identifier; and wherein the target network identifier is derived by the UE from the retrieved first network identifier and used by the UE to request the connection to the target WLAN.

7. A method according to claim 6, wherein the first network identifier is provided so as to further comprise an output of a cryptographic function performed on the target network identifier; and wherein the target network identifier is derived by the UE performing the cryptographic function upon the first network identifier.

8. A method according to claim 1, wherein the target WLAN and the first WLAN are the same.

9. A method according to claim 1 wherein the target WLAN and the hidden WLAN are the same.

10. A method according to claim 1, further comprising the step of changing the network device identifier after establishing a connection between the UE and the target WLAN.

11. A method of operating User Equipment (UE), the UE forming part of a telecommunications network comprising: a first Wireless Local Area Network (WLAN), identifiable by means of a first network identifier; a hidden WLAN having a hidden network identifier that is cryptographically derived from the first network identifier; and a target WLAN that is separate from the hidden WLAN; and the method comprising the steps of:

retrieving, from the first WLAN, the first network identifier;

cryptographically processing the retrieved first network identifier thereby to derive the hidden network identifier;

searching for a WLAN using the derived hidden network identifier; and requesting a connection to, or via, the target WLAN only after discovering the hidden WLAN; and the method further comprises the steps of:

retrieving a network device identifier associated with a Wireless Access Point (WAP), wherein said WAP provides the first WLAN; and further providing the first network identifier so as to comprise an output of an encryption function performed on the network device identifier.

12. A non-transitory computer-readable carrier medium comprising a computer program, which, when the computer program is executed by a computer, causes the computer to carry out the steps of claim 1.

13. User Equipment (UE) configured to access a telecommunications network, the telecommunications network comprising: a first Wireless Local Area Network (WLAN), identifiable by means of a first network identifier; a hidden WLAN having a hidden network identifier that is cryptographically derived from the first network identifier; and a target WLAN that is separate from the hidden WLAN; and the UE comprising:

a processor configured to cause the UE to:

retrieve, from the first WLAN, the first network identifier;

cryptographically process the retrieved first network identifier thereby to derive the hidden network identifier;

search for a WLAN using the derived hidden network identifier; and a controller configured to cause the UE to request a connection to, or via, the target WLAN only after discovering the hidden WLAN;

wherein the UE is configured to:

retrieve a network device identifier associated with a Wireless Access Point (WAP), wherein said WAP provides the first WLAN; and further provide the first network identifier so as to comprise an output of an encryption function performed on the network device identifier.

14. A telecommunications system comprising:

User Equipment (UE) according to claim 13; and a set of Wireless Access Points (WAPs).

15. The method according to claim 11, further comprising preventing the UE from requesting a connection with the target WLAN in response to the hidden WLAN remaining hidden to the UE.

16. The UE according to claim 13, wherein the controller is further configured to cause the UE to prevent the UE from requesting a connection with the target WLAN in response to the hidden WLAN remaining hidden to the UE.

* * * * *